United States Patent
Kreutzkaemper et al.

(10) Patent No.: US 10,088,100 B2
(45) Date of Patent: Oct. 2, 2018

(54) LUBRICATING SYSTEM FOR A BEARING, BEARING INCLUDING A LUBRICATING SYSTEM, AND METHOD FOR LUBRICATING A BEARING

(71) Applicants: Juergen Kreutzkaemper, Waibstadt-Daisbach (DE); Stefan Schuermann, Walldorf (DE); Martin Teupner, Neuluβheim (DE); Johannes Ullmann, Wonfurt (DE)

(72) Inventors: Juergen Kreutzkaemper, Waibstadt-Daisbach (DE); Stefan Schuermann, Walldorf (DE); Martin Teupner, Neuluβheim (DE); Johannes Ullmann, Wonfurt (DE)

(73) Assignees: AKTIEBOLAGET SKF, Gothenburg (SE); SKF LUBRICATION SYSTEMS GmbH, Walldorf (DE)

( * ) Notice: Subject to any disclaimer, the term of this patent is extended or adjusted under 35 U.S.C. 154(b) by 65 days.

(21) Appl. No.: 14/638,454

(22) Filed: Mar. 4, 2015

(65) Prior Publication Data
US 2015/0252944 A1   Sep. 10, 2015

(30) Foreign Application Priority Data
Mar. 6, 2014 (DE) .................. 10 2014 204 062

(51) Int. Cl.
| | |
|---|---|
| *F16N 29/02* | (2006.01) |
| *F16N 7/40* | (2006.01) |
| *F16C 33/66* | (2006.01) |
| *F16C 33/10* | (2006.01) |

(52) U.S. Cl.
CPC .......... *F16N 29/02* (2013.01); *F16C 33/6625* (2013.01); *F16N 7/40* (2013.01); *F16C 33/102* (2013.01); *F16C 33/105* (2013.01); *F16C 33/6674* (2013.01); *F16C 33/6685* (2013.01)

(58) Field of Classification Search
CPC .... F16C 33/6622; F16C 33/6685; F16N 7/40; F16N 29/02; F16N 31/00
See application file for complete search history.

(56) References Cited

U.S. PATENT DOCUMENTS

| | | | | |
|---|---|---|---|---|
| 3,743,444 A | * | 7/1973 | Kazama | ............... F04B 53/141 137/214 |
| 4,006,944 A | | 2/1977 | Ando et al. | |
| 4,738,336 A | * | 4/1988 | Smith | ..................... F16N 29/02 184/108 |

(Continued)

FOREIGN PATENT DOCUMENTS

| | | |
|---|---|---|
| CN | 1836095 A | 9/2006 |
| CN | 101131182 A | 2/2008 |

(Continued)

*Primary Examiner* — Minh Truong
(74) *Attorney, Agent, or Firm* — Bryan Peckjian; SKF USA Inc. Patent Dept.

(57) ABSTRACT

A lubricating system for a bearing includes a lubricant supplying system having a first pumping device configured to introduce a first quantity of lubricant into the bearing, a lubricant disposal system including a second pumping device configured to remove a second quantity of lubricant from the bearing, and a controlling device configured to activate the first pumping device and the second pumping device interdependently with each other.

10 Claims, 1 Drawing Sheet

(56) References Cited

U.S. PATENT DOCUMENTS

| | | | |
|---|---|---|---|
| 6,330,525 B1 * | 12/2001 | Hays | G05B 23/0235 376/245 |
| 6,853,954 B2 * | 2/2005 | Apostolides | F01M 1/18 702/182 |
| 7,140,468 B2 * | 11/2006 | Rake | F16N 29/02 184/6.23 |
| 7,793,681 B2 * | 9/2010 | Apostolides | F01M 11/0408 137/266 |
| 7,824,105 B2 | 11/2010 | Norihisa | |
| 8,464,837 B2 * | 6/2013 | Algulin | F16N 7/38 137/551 |
| 2003/0115977 A1 * | 6/2003 | Holweg | F16C 19/52 73/865.9 |
| 2004/0040789 A1 | 3/2004 | Rake et al. | |
| 2004/0263342 A1 * | 12/2004 | Matlock | H02H 7/0822 340/648 |
| 2009/0129714 A1 * | 5/2009 | Shimomura | F16C 19/26 384/475 |
| 2009/0250296 A1 | 10/2009 | Hannaford et al. | |
| 2010/0157304 A1 * | 6/2010 | Takahashi | F16C 19/52 356/442 |
| 2011/0017013 A1 * | 1/2011 | Bader | F16H 57/01 74/606 R |
| 2013/0284539 A1 | 10/2013 | Kobayashi | |
| 2014/0341490 A1 * | 11/2014 | Ito | F16C 33/6607 384/471 |
| 2016/0160714 A1 * | 6/2016 | James | F01D 25/20 60/783 |
| 2018/0038417 A1 * | 2/2018 | Lang | F16C 19/38 |

FOREIGN PATENT DOCUMENTS

| | | |
|---|---|---|
| CN | 101182901 A | 5/2008 |
| CN | 102713322 A | 10/2012 |
| CN | 102859216 A | 1/2013 |
| CN | 102918285 A | 2/2013 |
| CN | 103375489 A | 10/2013 |
| DE | 60121295 | 6/2007 |
| DE | 102007039418 A1 | 4/2008 |
| DE | 202010014100 U1 | 12/2010 |
| DE | 112010003390 | 12/2012 |
| GB | 1499551 A | 2/1978 |
| GB | 2458937 A | 10/2009 |
| JP | 2008303988 A | 12/2008 |
| WO | 2011018492 A1 | 2/2011 |
| WO | 2012038327 A1 | 3/2012 |
| WO | 2013103310 A1 | 7/2013 |

\* cited by examiner

LUBRICATING SYSTEM FOR A BEARING, BEARING INCLUDING A LUBRICATING SYSTEM, AND METHOD FOR LUBRICATING A BEARING

CROSS-REFERENCE

This application claims priority to German patent application no. 10 2014 204 062.0 filed on Mar. 6, 2014, the contents of which are fully incorporated herein by reference.

TECHNOLOGICAL FIELD

The present disclosure is directed to a lubricating system for a bearing and to a method for lubricating a bearing, and more specifically, to a lubricating system that controllably adds lubricant to and removes lubricant from the bearing and to an associated method.

BACKGROUND

Lubricants or lubricating media are used in a wide variety of bearings. Providing a bearing with an optimal supply of lubricant can protect the bearing from a variety of harmful influences and may increase the service life of the bearing. When the bearing operates, the lubricant is exposed to different loads or forces which may cause the lubricant to break down or deteriorate. For example, the lubricant may be subject to wear. Furthermore, contaminants or foreign bodies can accumulate in the lubricant. In addition, a quantity of lubricant in the bearing can change during operation. For example, the quantity of lubricant can increase when the bearing is relubricated and can decrease if lubricant leaks or escapes from the bearing.

In order to maintain a quality and/or quantity of lubricant in a bearing, the lubricant is usually replaced or supplemented. For this purpose different conventional lubricating systems or concepts can be employed. For example, in some conventional lubricating systems the lubricant of the bearing is completely replaced during scheduled maintenance work, at an interval that is set or suggested by the manufacturer, for example. In this way the quantity of lubricant can be held constant under certain conditions. However, the complete replacement of all lubricant at planned intervals means that the quality of the lubricant will periodically be at a high level and thereafter decrease substantially continuously until the next replacement is due. In other words, the quality of the lubricant generally falls between replacements.

Alternatively the bearing may be lubricated using a conventional centralized lubrication system. Conventional centralized lubrication systems introduce a partial quantity of lubricant, small in relation to the total quantity of lubricant of the bearing, into the bearing, usually at defined intervals. Usually the bearing then includes lubricant escape openings from which old or used lubricant escapes when new or fresh lubricant is introduced. The lubricant quality can usually be held at a relatively uniform level by the regular addition of fresh lubricant. However, a quantity of lubricant in the bearing cannot be precisely determined, because it is difficult to precisely control the amount of lubricant that escapes from the bearing when new lubricant is added.

SUMMARY

There is therefore a need to provide an improved method and apparatus for lubricating a bearing. This need is addressed by a lubricating system and method as discussed herein.

Exemplary embodiments relate to a lubricating system for a bearing. The lubricating system includes a lubricant supplying system including a pumping device. The pumping device is configured to a introduce a first quantity of lubricant into the bearing. The lubricating system also further comprises a lubricant disposal system including a pumping device that is configured to remove a second quantity of lubricant from the bearing. Furthermore, the lubricating system includes a controlling device. Using the controlling device the pumping devices of the lubricant disposal system and of the lubricant supplying system can be activated in an interdependent manner.

Since both the lubricant supplying system and the lubricant disposal system each include a separate pumping device, and these pumping devices can be activated interdependently, in some exemplary embodiments the second quantity of lubricant (the quantity removed from the bearing) can be adjusted based on the first quantity of lubricant introduced into the bearing. The quantity of lubricant that is located in the bearing could thus be defined with greater accuracy. The defining of a quantity of lubricant may comprise, for example, holding the quantity of lubricant to a certain level, or increasing or decreasing the quantity of lubricant by a defined amount. For example, under certain circumstances the amount of lubricant can be increased or decreased by 0%, 0.1%, 0.5%, 1%, 5%, 10%, 15%, and/or 20% of the total quantity of lubricant. If the bearing is empty, in some exemplary embodiments the bearing can be filled using the lubricant supplying system. Then, optionally, a to-be-introduced quantity of lubricant can be defined by mass, for example, as 3 kg or 25 kg, or by volume.

The pumping devices of the lubricant disposal system and of the lubricant supplying system can be two independent pumping devices working and operable independently of one another. Any conventional device can be used as the pumping devices described herein if it is suitable for introducing a lubricant into the bearing and/or removing it therefrom. The method and apparatus are also usable with any type of lubricant, for example, a lubricating grease, a lubricating liquid, a lubricating oil or the like.

A controlling device can be, for example, any device that is configured to activate a pumping device. For example, the controlling device can be a controller, a processor, a digital signal processor, a main or central processor (CPU), a multipurpose processor (MPP) or the like.

In some exemplary embodiments, a total quantity of lubricant in the bearing, which is intended to be used for a defined period of operation, is at least partially replaced during the defined period of operation. This can be effected, for example, by performing a plurality of partial-filling processes and a plurality of partial-emptying processes. For this purpose a plurality of partial quantities of lubricant (less than the entire volume in the bearing) can be supplied using the pumping device of the lubricant supplying system. In an analogous manner a plurality of partial quantities of lubricant can be removed using the pumping device of the lubricant disposal system. The activation of the pumping devices in short intervals can be effected, for example, by the controlling device. In this way, the amount of the lubricant can remain substantially the same over the defined period of operation, and severe fluctuations of the lubricant quality may be avoided. Under certain circumstances a severe fluctuation of lubricant quality can occur because the lubricant that is present after a complete replacement is fresh and unused, i.e. of a higher quality. However, the next replacement may not occur until the lubricant is almost consumed and thus has a poor quality.

The short intervals during which the pumping devices are activated can occur, for example, during the defined period of operation for which the total quantity of lubricant is provided. The partial quantity of lubricant may be a part of the total quantity of lubricant. The defined period of operation may be specified or suggested by a bearing manufacturer or a lubricant manufacturer. The intervals here can optionally all be the same length or have different lengths. Under certain circumstances an interval can be significantly smaller than the defined period of operation. For example, the length of an interval can fall in a value range whose initial and/or final value constitutes 0.1%, 0.5%, 1%, 3%, 5% or 10% of the total period of operation for which the total quantity of lubricant is provided. Under certain circumstances the partial quantity of lubricant and the interval can have an identical divisor with respect to the total quantity of lubricant and the total period of operation.

In some further exemplary embodiments the second quantity of lubricant, the quantity removed from the bearing, corresponds to the first quantity of lubricant, the quantity that is introduced into the bearing. The pumping device of the lubricant disposal system can be accordingly controlled by the controlling device. In some exemplary embodiments the total quantity of lubricant in the bearing remains substantially constant. Influence could thus be exerted on the quantity of lubricant that escapes from the bearing or is disposed of therefrom. This is possible because the removal of the lubricant is carried out actively, namely via a separate pumping device. This active disposing or removal of the lubricant differs from a so-called passive disposing of lubricant. In conventional lubricating systems introducing new lubricant into a bearing pushes out old or used lubricant through lubricant bores or oil bores almost as a side effect. In contrast, in some exemplary embodiments a quantity of the escaping lubricant can be controlled and/or actively determined or influenced.

Additionally or alternatively, in some exemplary embodiments the lubricant supplying system comprises a measuring device. Using the measuring device a volume and/or a mass of the first quantity of lubricant can be determined. In some exemplary embodiments the controlling device may contain information about how much lubricant is supplied to the bearing in a partial filling process. In an analogous manner, in some exemplary embodiments the lubricant disposal system can also include a measuring device. Using the measuring device of the lubricant disposal system, a volume or a mass of the second quantity of lubricant can be determined. Since in some exemplary embodiments exact information about the supplied and removed quantity of lubricant is available, improved coordination of the second removed quantity of lubricant with the first supplied quantity of lubricant is possible. Thus, for example, a total lubricant quantity in the bearing can be held constant. Since the volume and/or the mass is determined, the actual introduced and/or discharged quantities can be more precisely determined.

In order to obtain precise-as-possible results or values for the volume of lubricant added or removed, in some further exemplary embodiments at least one of the measuring devices comprises further sensors. These sensors can be configured to determine whether the introduced or discharged quantity actually comprises only lubricant or also contains gas inclusions such as air bubbles or the like.

In some further exemplary embodiments the lubricating system comprises a lubricant analyzing device using which a state of the second removed quantity of lubricant can be determined. Thus in some exemplary embodiments an interval during which the pumping device is activated can be adjusted. Additionally or alternatively the quantity of the supplied and/or removed lubricant can be adjusted based on a determined state (for example, quality) of the removed lubricant. In other words, when the lubricant being removed is not significantly degraded, the intervals at which lubricant is added can be increased and/or the supplied quantity can be reduced. In an analogous manner, when the removed lubricant is of poor quality the intervals at which lubricant is added and/or removed could be shortened and/or the supplied quantity of lubricant could be increased. The state of the lubricant that is detected can be, for example, an age of the lubricant, a flow behavior of the lubricant, a contamination level of the lubricant, a degree of the consumption of the lubricant, and/or the like. With a good state of the lubricant, for example, a low contamination, a low wear, a low age, a low consumption and/or the like can then be present. Additionally or alternatively, using the lubricant analyzing device, in some exemplary embodiments it can be determined whether it is the old and/or worn out lubricant that is being removed or whether the lubricant that was recently introduced into the bearing is being removed in an undesired manner. Furthermore, conclusions about the state of the bearing could be drawn from the state or consumption of the second, removed quantity of lubricant.

Additionally or alternatively, in some exemplary embodiments the lubricating system comprises a bearing analyzing device using which a state of the bearing can be determined. In some exemplary embodiments the interval for supplying and/or removing the quantity of lubricant and also the quantity of lubricant itself can optionally be adjusted based on the information about the state of the bearing. Furthermore, a total quantity of lubricant can also be adjusted on the basis of the information about a state of the bearing. In order to determine the state of the bearing, a sound volume created by the bearing in operation can be determined. Additionally or alternatively, vibrations that occur during bearing operation can be used for the state analysis of the bearing. In order to adjust the second quantity of lubricant to the first quantity of lubricant this can be enlarged or reduced, for example.

In some further exemplary embodiments the controlling device is configured to adjust the quantity of lubricant supplied to the bearing relative to the quantity of the lubricant removed from the bearing. Thus the total quantity of lubricant in the bearing could be changed depending on the determined state of the bearing and/or the state of the second removed quantity of lubricant.

According to a further aspect, the disclosure relates to a bearing that includes a lubricating system according to at least one of the exemplary embodiments which may simplify or improve the maintenance of that bearing. The maintenance or the lubricant replacement of bearings that are difficult to access can thus possibly be simplified. For example, the bearing according to some exemplary embodiments may be used for supporting a rotor in a windmill or a wind wheel or a wind turbine.

According to a further aspect, exemplary embodiments relate to a method for lubricating a bearing that includes activating a pumping device of a lubricant supplying system to introduce a first quantity of lubricant into the bearing. The method also includes activating a pumping device of a lubricant disposal system to remove a second quantity of lubricant from the bearing. The activation of each of the two pumping devices is coordinated with the activation of the other device. Since the two pumping devices are activated interdependently with each other, in some exemplary embodiments it may be possible to adjust and/or coordinate the first quantity of lubricant the second quantity of lubricant.

BRIEF DESCRIPTION OF THE DRAWINGS

Further advantageous designs are described in more detail below with reference to the exemplary embodiments depicted in the drawings; however, the disclosure is not limited to these exemplary embodiments.

DETAILED DESCRIPTION

Figure 1:
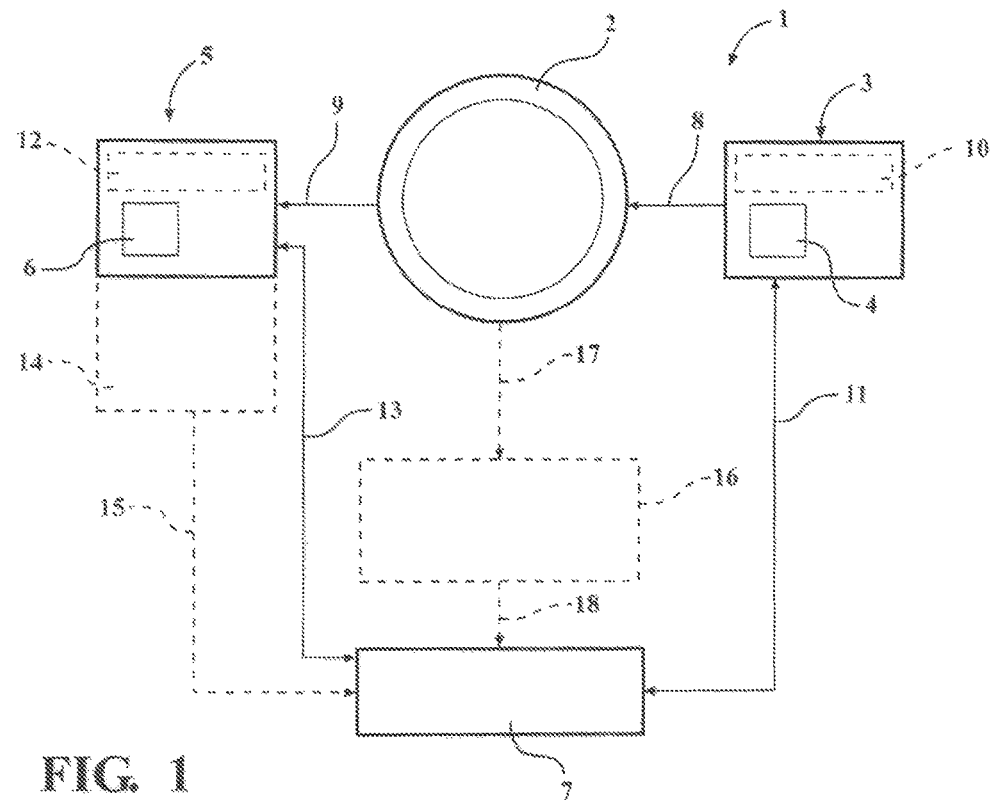
FIG. 1 is a schematic depiction of a lubricating system for a bearing according to an exemplary embodiment.

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

FIG. 1 shows a schematic depiction of a lubricating system 1 for a bearing 2 according to an exemplary embodiment.

The lubricating system 1 shown in FIG. 1 for the bearing 2 comprises a lubricant supplying system 3 having a pumping device 4. The pumping device 4 is configured to introduce a first quantity of lubricant 8 into the bearing 2. The lubricating system 1 also comprises a lubricant disposal system 5. The lubricant disposal system 5 includes a pumping device 6 that is configured to remove a second quantity of lubricant 9 from the bearing 2. Furthermore, the lubricating system 1 also includes a controlling device 7 which is configured to activate the pumping device 6 of the lubricant disposal system 5 and the pumping device 4 of the lubricant supplying system 3 interdependently with each other.

In other words, for the lubricating system 1 a centralized lubrication system includes a controlling device and a lubricant disposal system 5 and a lubricant supplying system 3. The two systems can be operated interdependently or independently of one another from a common controller, i.e. the controlling device 7. The lubricant disposal system 5 can, for example, also be referred to as an inverted centralized lubrication system. The activation of the pumping device 6 in a manner that depends on the pumping device 4 can be effected, for example, based on information about an interval, a quantity, and/or a state of the bearing 2 and/or of the lubricant.

All possible pumps, for example, piston pumps, gear- or gear-ring-pumps, can be used as pumping devices 4 and/or 6. The pumping devices 4 and 6 can optionally be different, similar, or even identical pumping devices with respect to a construction, size, functionality, and/or the like.

Any lubricant can be used, for example lubricating oils or lubricating greases, as lubricant which is used in the lubricating system 1 for the bearing 2. For some applications lubricating greases of the NLGI class (from: consistency identification number according to DIN 51818) 1 or 2 or consistency class 1 or 2 are used.

Using the lubricating system 1 a portion of the lubricant or a total quantity of lubricant in the bearing 2 can be continuously replaced. A continuous replacement of the total quantity of lubricant can be carried out, for example, by supplying and/or removing partial quantities of lubricant in successive intervals. Under certain circumstances the intervals or the spacings between the intervals can result here in that a total service life or an operating period of the lubricant, or a period wherein the lubricant of a bearing is to be completely replaced, is divided into a plurality of units or intervals. In a bearing for which, for example, 20 kg of lubricant is provided, which is to be renewed after two years, each year then, i.e. in two intervals, two partial quantities of lubricant of 10 kg each can be refilled and removed again. In other exemplary embodiments approximately 30 g of lubricant can be supplied as partial quantity of lubricant to the bearing 2 and removed in an interval that comprises a day. Depending on the bearing, lubricating medium, total quantity of lubricant, and/or use of the bearing, an interval or spacing can fall in a value range having an initial value and/or a final value of 1 hour, 5 hours, 10 hours, 1 day, 2 days, 1 week, 1 month, a year, or the like.

In order to effect the continuous replacement, in certain spacings or intervals a first quantity of lubricant 8 is introduced into the bearing 2 using the pumping device 4 of the lubricant supplying system 3. The first quantity of lubricant 8 is fresh, unused lubricant. The fresh lubricant may not yet have been used in a bearing, may not yet have been subjected to a load, and/or not yet include any contaminants. Correspondingly the second quantity of lubricant is removed from the bearing 2 using the pumping device 6 of the lubricant disposal system 5. The second quantity of lubricant 9, which is removed from the bearing 2 using the lubricant disposal system 5, is thus used lubricant. The second quantity of lubricant 9 or the used lubricant has been, for example, subjected to shear forces in the bearing 2 and/or been agitated, and/or can include impurities.

In the exemplary embodiment of FIG. 1 the lubricant supplying system 3 optionally comprises a measuring device 10. Using the measuring device 10 the size of the first quantity of lubricant 8 that is introduced into the bearing 2 can be determined. For this purpose, for example, a volume and/or a mass of the quantity of lubricant 8 can be determined. In order to determine the volume or the mass of the first quantity of lubricant 8, a metering device (not illustrated) can optionally be used. For example, for this purpose the lubricant to be introduced can be pre-metered and then introduced into the bearing 2 using the pumping device 4. Under certain circumstances the pre-metering of the lubricant can occur in a volume-based manner. Determining the quantity of lubricant 8 can also optionally be effected via a so-called progressive system. For example, the strokes executed by the pumping device 4 can be recorded. The volume of the first quantity of lubricant 8 can then also be determined based on a stroke volume of the pumping device 4 that is known or communicated to the controlling unit 7.

The controlling device 7 can thus receive information from the lubricant supplying system 3 about the first introduced quantity of lubricant 8 or its volume and/or its mass, as indicated by an arrow 11. Measured values can thus be exchanged between the controlling device 7 and the lubricant supplying system 3, for example, from the lubricant supplying system 3 to the controlling device 7. Furthermore, as indicated by the double-sided arrow 11, control signals can be exchanged from the controlling device 7 to the lubricant supplying system 3. These control signals can serve, for example, to activate the pumping device 4 of the lubricant supplying system 3. In other words, as a system for supplying lubricant the lubricant supplying system 3 can keep track of a quantity of lubricant supplied.

In an analogous manner to the lubricant supplying system 3, in the exemplary embodiment of FIG. 1 the lubricant disposal system 5 also comprises a measuring device 12. Thus as a system for lubricant disposal the lubricant disposal system 5 can also keep track of an amount of lubricant removed from a bearing. The measuring device 12 can be configured in a substantially analogous manner to the measuring device 10. The measuring device 12 serves for recording a volume or a mass of the second quantity of lubricant 9 removed from the bearing 2. Under certain circumstances a device other than the device for the determining of the introduced first quantity of lubricant 8 can be used as the measuring device 12 for recording the second or used quantity of lubricant 9. This may be desirable, for example, if the used lubricant has different properties than the fresh lubricant, i.e. the first quantity of lubricant 8. For example, the volume of the second quantity of lubricant 9 might include air bubbles, and a different device would be appropriate for determining the volume of lubricant without the air bubbles.

As indicated by the arrow 13, the controlling device 7 can also communicate with the lubricant disposal system 5. Measured values and/or control signals, for example, can thus be exchanged between the lubricant disposal system 5 and the controlling device 7. Due to the combination of the lubricant supplying system 3 for supplying the bearing 2 with lubricant and the lubricant disposal system 5 for removing lubricant from the bearing 2 with a common control provided by the controlling device 7, in some exemplary embodiments the lubricant supplying system 3 can continuously supply the bearing 2 with defined quantities of fresh lubricant, i.e. the first quantity of lubricant 8. The lubricant quality in the bearing 2 can thereby be held at a consistently high level. The lubricant disposal system 5 continuously removes defined quantities of used lubricant, i.e. the second quantity of lubricant 9, from the bearing 2 and thus helps keep the quantity of lubricant, or the total quantity of lubricant in the bearing 2, substantially constant. Due to the interaction of these two components the lubricant in the bearing 2 is continuously renewed, and a replacement of the lubricant in defined intervals is made possible. The common controlling device 7 regulates and monitors the operation of the two components, the lubricant supplying system 3 and lubricant disposal system 5. Since both the first quantity of lubricant 8 and the second quantity of lubricant 9 are determined, the quantities can be adjusted relative to each other. For example, they can be adjusted so that they are identical in order to hold the total quantity of lubricant in the bearing 2 constant. Alternately, in order to reduce the total quantity of lubricant in the bearing 2, the second removed quantity of lubricant 9 can be larger than the first supplied quantity of lubricant 8. Conversely, to increase the quantity of lubricant in the bearing 2, the first supplied quantity of lubricant 8 can be made larger than the second removed quantity of lubricant 9.

In the exemplary embodiment of FIG. 1 the lubricating system 1 also comprises a lubricant analyzing device 14 for carrying out a state analysis of the removed lubricant, i.e. of the second quantity of lubricant 9. Optionally a quality analysis of the second quantity of lubricant 9 can be carried out. This quality analysis of the second quantity of lubricant 9, may comprise, for example, an analysis of the flow behavior, the age, and/or the degree of contamination of the lubricant.

The values determined using the lubricant analyzing device 14 can, as indicated by the arrow 15, be communicated to the controlling device 7. Depending on the determined lubricant state, for example, a slower lubricant exchange can be effected by the controlling device 7, for example, if the removed quantity of lubricant 9 has a certain lubricant quality, such as good or still too good. Then the intervals wherein the lubricant is exchanged, i.e. introduced and removed, can optionally be increased. Additionally or alternatively, the quantity of lubricant used in a partial-filling and emptying process can also be reduced. The lubricant exchange can thus, for example, be adjusted in quantity and frequency based on a measured lubricant quality.

In the exemplary embodiment of FIG. 1 the lubricating system 1 optionally further comprises a bearing analyzing device 16. Using the bearing analyzing device 16 monitoring of a state of the bearing 2 can be carried out. As indicated by the arrow 17, the bearing analyzing device 16 can receive information about the state of the bearing 2. As indicated by the arrow 18 this information can be transmitted to the controlling device 7. Using the bearing analyzing device 16 a state monitoring (for example condition monitoring) of the bearing 2 can thus be carried out. For example, a noise and/or sound volume that occurs during the operation of the bearing 2 can be measured and recorded. Additionally or alternatively, vibrations that occur during operation of the bearing 2 can also be measured and/or recorded and/or evaluated. Depending on the recorded bearing state, a total quantity of lubricant in the bearing 2 can be increased and/or decreased. For example, increased vibration values may require an increase in a quantity of lubricant or the total quantity of lubricant in the bearing 2. In other words, by the integration of further components, such as, for example, the bearing analyzing device 16 or the lubricant analyzing device 14, further influencing variables can be introduced into the lubricating system 1, using which the bearing lubrication can be further optimized. In some exemplary embodiments the lubricating system 1 can be used as an integrated intelligent large-bearing lubrication system for optimal lubrication of bearings or large bearings. For this purpose an active lubricant supplying into the bearing and an active lubricant removal from the bearing is combined with a common controlling.

By integrating further components the lubricating system 1 can thus, for example, be modularly extended with functions. In some cases the system can be connected to so-called Condition Monitoring Systems or State Analysis Systems (from English: "state analysis," for example lubricant state analysis and bearing state analysis). Thus if the recorded bearing or lubricant states indicate damage to the bearing, the degree of filling or the total quantity of lubricant in the bearing 2 can be adjusted, for example, increased. This may allow any damage to the bearing or to bearing components to be avoided or at least delayed.

Figure 2:
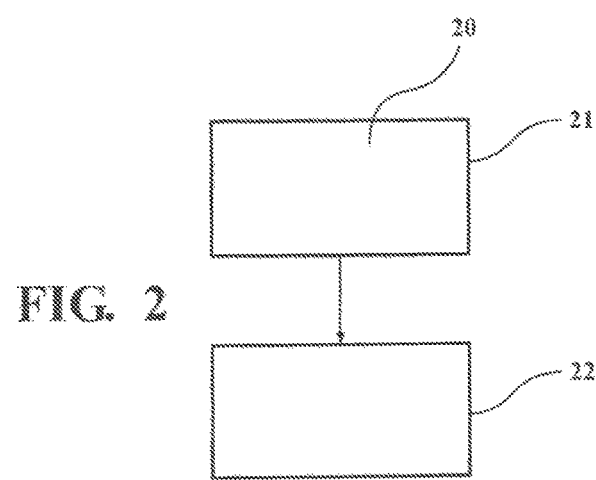
FIG. 2 is a schematic depiction of a method for lubricating a bearing according to an exemplary embodiment.

FIG. 2 shows a schematic depiction of a method 20 for lubricating a bearing according to an exemplary embodiment.

In the method 20 for lubricating a bearing using a pumping device of a lubricant supplying system is activated in a process 21, so that this pumping device introduces a first quantity of lubricant into the bearing. In another process 22 a pumping device of a lubricant disposal system is activated so that this pumping device removes a second quantity of lubricant from the bearing. The activation of the two pumping devices occurs here interdependently one-with-the-other, that is, the operation of the two pumping devices is coordinated.

A complete system or method is provided by the combination of lubricant supplying and disposal from the bearing that can ensure an optimal lubricating of the bearing. Using the method 20 or the lubricating system 1 the bearing 2 can be held in an optimal state. Furthermore, a lubricant quality can be maintained at a consistently high level by the continuous lubricant exchange. A constant degree of filling of the bearing 2 can also be realized by the controlled supplying and/or removing of lubricant or grease with a recording of the quantities supplied and removed.

Using the lubricating system 1 and the method 20 according to the exemplary embodiments, the reliability of some bearings and their expected service life can be increased. The lubricating system 1 for a bearing 2 and the method 20 for lubricating the bearing 2 can be used in a variety of applications. For example, the bearing 2 can be a rolling-element or sliding bearing. Additionally or alternatively, the bearing 2 can be a large bearing. Large bearings can have a diameter of over 500 mm. These large bearings can represent central components in a variety of systems and applications.

In the same manner the lubricating system 1 can also be used in intermediate or smaller bearings, i.e., for example, having a diameter that is smaller than 500 mm.

For example, the system 1 and the method 20 can be used in all possible types of bearings, particularly in application cases where those bearings are difficult to access. The lubricating system or also the method can be used or applied, for example, in bearings of presses, machines for energy generation, machines for renewable energy generation such as wind turbines, machine tools, generators, turbines, in the mining industry (e.g. mining), machines for paper-manufacturing and/or processing and the like. For these applications the optimal supplying of the bearing with lubricant can offer a possibility to protect the bearing from a variety of harmful influences.

The exemplary embodiments and their individual features disclosed in the above description, the following claims, and the accompanying Figures can be meaningful and implemented both individually and in any combination for the realization of an exemplary embodiment in its various designs.

In some further exemplary embodiments, features that are disclosed in other exemplary embodiments as device features can also be implemented as method features. Furthermore, features that are implemented in some exemplary embodiments as method features can also optionally be implemented in other exemplary embodiments as device features.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Lubricating system
2 Bearing
3 Lubricant supplying system
4 Pumping device
5 Lubricant disposal system
6 Pumping device
7 Controlling device
8 First quantity of lubricant
9 Second quantity of lubricant
10 Measuring device
11 Arrow (data exchange, arrow direction, data direction)
12 Measuring device
13 Arrow
14 Lubricant analyzing system
15 Arrow
16 Bearing analyzing system
17 Arrow
20 Method
21 Activating
22 Activating

What is claimed is:

1. A lubricating system for a bearing, comprising:
a lubricant supplying system including a first pumping device configured to introduce a first quantity of lubricant into the bearing;
a lubricant disposal system including a second pumping device configured to remove a second quantity of lubricant from the bearing;
a controlling device configured to activate the first pumping device and the second pumping device interdependently with each other, wherein the controlling device is adaptable to receive information from the lubricant supplying system and the lubricant disposal system to:
  (i) analyze a flow behavior, an age, and a degree of contamination of lubricant, and
  (ii) adjust quantity and frequency of the first quantity of lubricant introduced into the bearing and the second quantity of lubricant removed from the bearing based on a measured lubricant quality;
a first measuring device communicatively coupled to the controlling device and configured to determine at least one of a volume or a mass of the first quantity of lubricant introduced into the bearing, wherein the first measuring device additionally comprises a first sensor configured to determine whether the first quantity of lubricant contains gas inclusions;
a second measuring device communicatively coupled to the controlling device and configured to determine at least one of a volume or a mass of the second quantity of lubricant removed from the bearing, wherein the second measuring device additionally comprises a second sensor configured to determine whether the second quantity of lubricant contains gas inclusions;
a lubricant analyzing device for determining a state of the second quantity of lubricant removed from the bearing, wherein the state of the second quantity of lubricant is based on an age of lubricant, a flow behavior of lubricant, a contamination level of lubricant, or a degree of the consumption of lubricant; and
a bearing analyzing device positioned between the controlling device and the bearing for receiving information about a state of the bearing and transmitting the information to the controlling device, wherein the controlling device is configured, based on the state of the bearing, to make an adjustment of at least one of a quantity of supply of lubricant, a quantity of removal of lubricant, a frequency of supply of lubricant, or a frequency of removal of lubricant.

2. The lubricating system according to claim 1, wherein the controlling device is configured to activate the first and the second pumping devices in short intervals to supply a plurality of partial quantities of lubricant in a plurality of partial filling processes by the first pumping device, and to remove a plurality of partial quantities of lubricant by a plurality of partial emptying processes by the second pumping device so that a total quantity of lubricant in the bearing, which is provided for a defined period of operation, is at least partially replaced during the defined period of operation.

3. The lubricating system according to claim 2, wherein the controlling device is configured to control the second pumping device such that the second quantity of lubricant corresponds to the first quantity of lubricant so that a total quantity of lubricant in the bearing is substantially constant.

4. The lubricating system according to claim 1, wherein the bearing analyzing device is further configured to determine the state of the bearing by determining a sound volume of the bearing or vibrations of the bearing.

5. The lubricating system according to claim 1, wherein the controlling device is configured to activate the first pumping device in short intervals to supply a plurality of partial quantities of lubricant in a plurality of partial filling processes, and to activate the second pumping device in a plurality of short intervals to remove a plurality of partial quantities of lubricant by a plurality of partial emptying processes.

6. The lubricating system according to claim 1, wherein the controlling device is configured to operate the first pumping device and the second pumping device simultaneously in order to maintain a substantially constant quantity of lubricant in the bearing.

7. The lubricating system according to claim 1, further including the second sensor configured to determine whether gas is present in the second quantity of lubricant.

8. A method for lubricating a bearing comprising:
  activating a pumping device of a lubricant supplying system to introduce a first quantity of lubricant into the bearing; and
  activating a pumping device of a lubricant disposal system to remove a second quantity of lubricant from the bearing,
  wherein the pumping device of the lubricant supplying system and the pumping device of the lubricant disposal system are activated interdependently with each other by a controlling device, wherein the controlling device receives information from the lubricant supplying system and the lubricant disposal system to:
    (i) analyze a flow behavior, an age, and a degree of contamination of lubricant, and
    (ii) adjust quantity and frequency of the first quantity of lubricant introduced into the bearing and the second quantity of lubricant removed from the bearing based on a measured lubricant quality;
  activating a first measuring device communicatively coupled to the controlling device to determine at least one of a volume or a mass of the first quantity of lubricant introduced into the bearing, wherein the first measuring device additionally comprises a first sensor to determine whether the first quantity of lubricant contains gas inclusions;
  activating a second measuring device communicatively coupled to the controlling device to determine at least one of a volume or a mass of the second quantity of lubricant removed from the bearing, wherein the second measuring device additionally comprises a second sensor to determine whether the second quantity of lubricant contains gas inclusions;
  activating a lubricant analyzing device to determine a state of the second quantity of lubricant removed from the bearing, wherein the state of the second quantity of lubricant is based on an age of lubricant, a flow behavior of lubricant, a contamination level of lubricant, or a degree of the consumption of lubricant; and
  activating a bearing analyzing device positioned between the controlling device and the bearing to receive information about a state of the bearing and transmit the information to the controlling device, wherein the controlling device, based on the state of the bearing, makes an adjustment of at least one of a quantity of supply of lubricant, a quantity of removal of lubricant, a frequency of supply of lubricant, or a frequency of removal of lubricant.

9. The method of claim 8 wherein activating the pumping device of the lubricant supplying system and the pumping device of the lubricant disposal system interdependently with each other comprises operating the pumping device of the lubricant supplying system and the pumping device of the lubricant disposal system simultaneously to maintain a substantially constant quantity of lubricant in the bearing.

10. The method of claim 8 including detecting gas inclusions in the second quantity of lubricant and changing the first quantity of lubricant when gas such as air bubbles are detected.

* * * * *